(12) United States Patent
Preisinger et al.

(10) Patent No.: US 7,446,989 B2
(45) Date of Patent: Nov. 4, 2008

(54) DEVICE FOR PROTECTION OF THE BEARING OF AN ELECTRICAL MACHINE AGAINST DAMAGING PASSAGE OF CURRENT

(75) Inventors: Gerwin Preisinger, Steyr (AT); Frank Buschbeck, Vienna (AT); Martin Gröschl, Vienna (AT)

(73) Assignee: AB SKF, Gothenburg (SE)

( * ) Notice: Subject to any disclaimer, the term of this patent is extended or adjusted under 35 U.S.C. 154(b) by 174 days.

(21) Appl. No.: 10/771,405

(22) Filed: Feb. 5, 2004

(65) Prior Publication Data

US 2004/0189115 A1 Sep. 30, 2004

(30) Foreign Application Priority Data

Feb. 7, 2003 (DE) .............................. 203 01 956 U

(51) Int. Cl.
| | |
|---|---|
| H02H 5/04 | (2006.01) |
| H02H 7/08 | (2006.01) |
| G01R 31/00 | (2006.01) |
| G06F 19/00 | (2006.01) |
| H01F 30/12 | (2006.01) |
| H01F 38/38 | (2006.01) |

(52) U.S. Cl. ............................ 361/23; 702/58; 702/59; 323/361

(58) Field of Classification Search .................... 702/58; 323/361; 361/23
See application file for complete search history.

(56) References Cited

U.S. PATENT DOCUMENTS 5,859,529 A * 1/1999 Baumgartl et al. .......... 323/361
6,127,778 A * 10/2000 Op Het Veld et al. ........ 313/594
6,449,567 B1 * 9/2002 Desai et al. .................. 702/58

FOREIGN PATENT DOCUMENTS

| DE | 1 136 004 | 6/1966 |
|---|---|---|
| GB | 2 377 037 A | 12/2002 |
| HU | 137.782 B | 11/1962 |
| JP | 9-205799 | 8/1997 |
| JP | 10-014159 A | 1/1998 |
| JP | 100141159 A | 1/1998 |
| JP | 2000270520 A | 9/2000 |
| JP | 2001-016896 A | 1/2001 |
| JP | 2003-032944 A | 1/2003 |
| JP | 2003032944 A | 1/2003 |
| WO | WO/02101911 A1 | 12/2002 |

OTHER PUBLICATIONS

Toshihisa Shimizu et al., "High Frequency Leakage Control Reduction Based on a Common-Mode Voltage Compensation Circuit," *IEEE*, pp. 1961-1967, 1996.
German Office Action dated Aug. 22, 2006.

* cited by examiner

*Primary Examiner*—Stephen W Jackson
*Assistant Examiner*—Lucy Thomas
(74) *Attorney, Agent, or Firm*—Buchanan Ingersoll & Rooney PC

(57) ABSTRACT

A device for protecting the bearing of an electrical machine against the damaging passage of current, wherein the electrical machine comprises a stator and a rotor pivotally mounted relative to the stator by the bearing. The device is provided with a compensation circuit which produces a compensation current which compensates for a parasitic current formed during operation of the electrical machine by the bearing and a coupling element for directly or indirectly coupling the compensation current into the bearing.

17 Claims, 1 Drawing Sheet

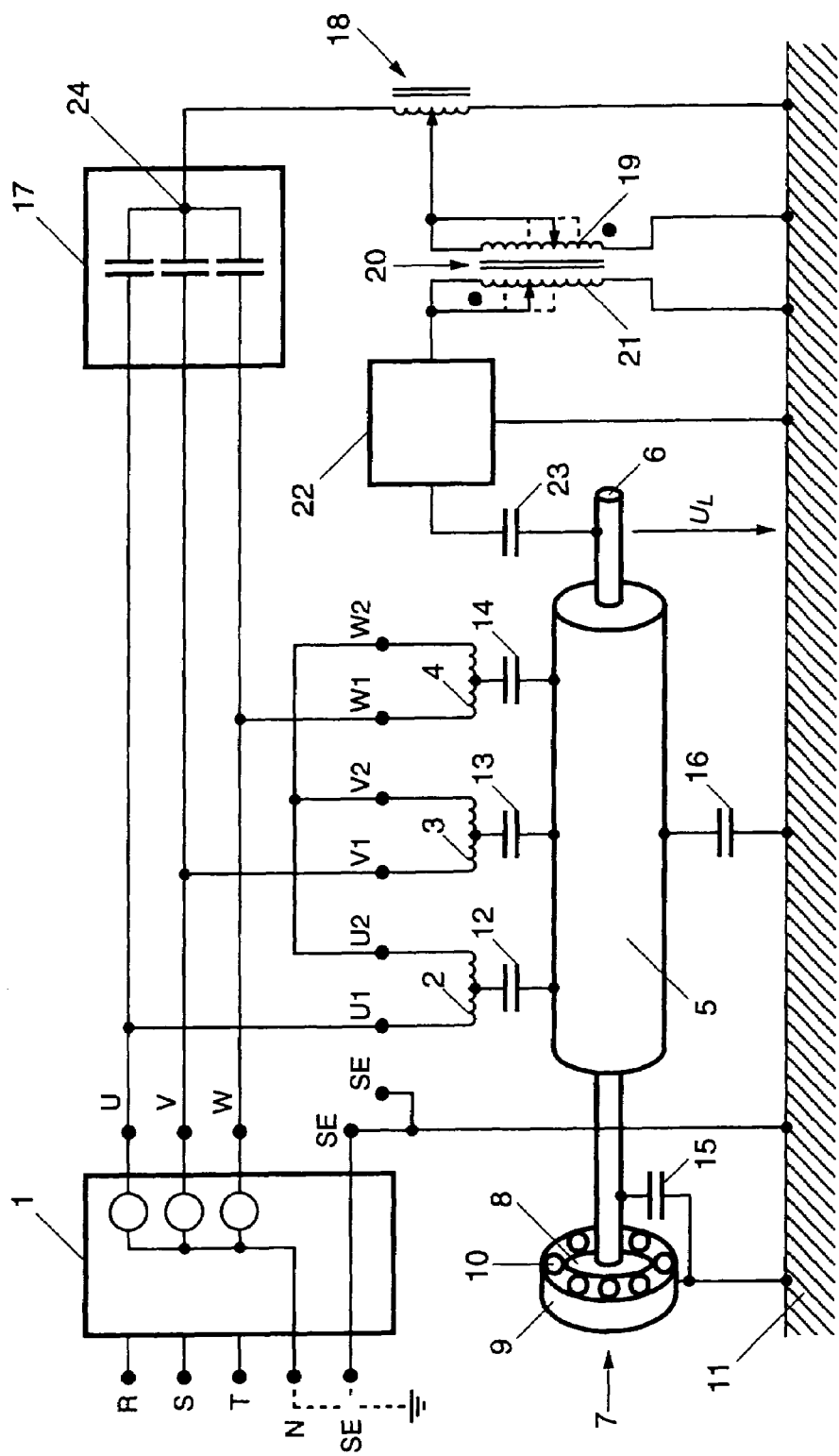

DEVICE FOR PROTECTION OF THE BEARING OF AN ELECTRICAL MACHINE AGAINST DAMAGING PASSAGE OF CURRENT

This application is based on and claims priority under 35 U.S.C. § 119 with respect to German Application No. 203 01 956.3 filed on Feb. 7, 2003, the entire content of which is incorporated herein by reference.

FIELD OF THE INVENTION

This invention generally relates to bearings. More particularly, the invention pertains to a device for protecting the bearing of an electrical machine against the passage of current.

BACKGROUND OF THE INVENTION

In electrical machinery, for example electric motors which are pivotally supported by a bearing, there is the danger that current will flow through the bearing and that the associated spark erosion will lead to bearing damage. Current flow through the bearing can be caused by the voltages on the terminals of the electric motor being coupled to the rotor of the electric motor via stray capacitances, for example out of the stator windings. The associated current flows ultimately cause voltage to form on the bearing, which voltage can be greater than the breakdown strength of the lubricating film in the bearing and thus can trigger spark erosion. The situation may be of particular concern in electric motors operated with frequency converters because especially high pulsed voltage characteristics occur on the terminals relative to the motor housing and the rotor. Relatively high voltages thus also occur on the bearing.

Generally speaking, bearings are protected against unwanted current passage by electrical insulation provided to prevent current passage. This can have a relatively high associated cost, however, depending on the special circumstances of the application. Moreover, DC electrical insulation of the bearing does not always constitute sufficient protection. Thus, for example, for high frequency parasitic currents there is the danger that coupling into the bearing will take place capacitively.

In this regard, the technical article "High Frequency Leakage Current Reduction Based on a Common-Mode Voltage Compensation Circuit" in the IEEE journal, 1996, pages 1961-1967, describes compensating high frequency leakage currents using a compensation circuit. The wiring is designed such that compensation occurs in the power path, i.e. upstream of the connected load. This has the disadvantage that the compensation circuit is incorporated into the power circuit and thus its components must be designed for comparatively high wattages. Moreover any reactive component which has been inserted into the power circuit, such as for example an inductance, a capacitance or a filter, increases the number of resonant frequencies, for which, when excited, unpredictable overvoltages can occur. Since, when using a frequency converter, it can be largely assumed that all these resonant frequencies can be excited, there is a high risk that such an overvoltage will occur.

SUMMARY OF THE INVENTION

A device that protects the bearing of an electrical machine against current passage comprises a compensation circuit which produces a compensation current which compensates for a parasitic current arising during operation of the electrical machine and passing through the bearing and a coupling element for direct or indirect coupling of the compensation current into the bearing.

According to another aspect of the invention, a device for protecting a bearing, which supports a rotor of an electrical machine, from passage of parasitic current arising from operation of the electrical machine comprises means for producing compensation current corresponding in magnitude to the parasitic current but opposite in phase to the parasitic current, and coupling means for coupling the compensation current into the bearing.

BRIEF DESCRIPTION OF THE DRAWING FIGURE

The foregoing and additional features and characteristics of the present invention will become more apparent from the following detailed description considered with reference to the accompanying drawing figure which illustrates an embodiment of a compensation circuit according to the invention which is incorporated into a circuit for triggering the electric motor.

DETAILED DESCRIPTION

The present invention has useful application in an electrical machine which has a stator and a rotor which is pivotally mounted by way of a bearing relative to the stator. Generally speaking, a compensation circuit and a coupling element are provided, with the compensation circuit producing a compensation current for the compensation of a parasitic current which arises or is produced during operation of the electrical machine and passes through the bearing and with the coupling element directly or indirectly coupling the compensation current into the bearing.

This arrangement helps provide relatively reliable protection of the bearing against current passage and thus against the associated potential damage of the bearing. The protective measure arises specifically at the point which is to be protected, specifically on the bearing. In this way the cost for implementation can be kept relatively low as the device in terms of wattage need not be designed for operation of the electrical machine, but simply for compensation of the parasitic current by the bearing. Another consequent advantage is that the device can be implemented largely independently of the power class of the electrical machine and can also be installed later into an existing system because there is no intervention into the triggering of the electrical machine.

The compensation circuit can have an artificial star point for preparing a star point voltage at which point the phase voltages intended for operation of the electrical machine are found. The artificial star point is generally formed by three identical impedances. In this way, a reference signal for compensation can be made available with a relatively simple arrangement or means.

Furthermore, the compensation circuit can have a polarity reversal transformer to which on the primary side the star point voltage is supplied in whole or in part and which on the secondary side produces a voltage which is opposite in phase to the star point voltage. The compensation circuit can have especially an amplitude matching stage which is connected between the artificial star point and the polarity reversal transformer and which applies an adjustable fraction of the star point voltage to the polarity reversal transformer. The polarity reversal transformer can have several winding taps. Furthermore, the polarity reversal transformer can be connected on the secondary side to the input of the frequency response matching stage which is used to equalize the frequency response of the compensation current to the parasitic current. The above described components are standard components which are available in the most varied embodiments so that optimum execution of the device is made possible for the respective application.

The output of the frequency response matching stage is connected to the coupling element. Here the coupling element is arranged especially so that coupling of the compensation current takes place into the rotor shaft with which the rotor in the bearing is pivotally mounted. Preferably, the coupling element is made as a capacitor. In this way, the compensation current can be coupled without contact into the shaft and thus into the bearing so that no wear problems occur in the coupling element when the compensation current is coupled in.

Referring to the drawing figure, the illustrated embodiment of the compensation circuit is incorporated into a circuit for triggering the electric motor. The electric motor is triggered by way of a frequency converter 1 which delivers on the output side three phase voltages U, V, W which are applied in the form of a star connection to the first stator winding 2, the second stator winding 3 and the third stator winding 4 (i.e., to each of the three stator windings 2, 3, 4) and is connected at one end to one of the outputs of the frequency converter 1 on which one of the voltages U, V, W is present. The other ends of the three stator windings 2, 3, 4 at the time are interconnected.

In addition to the stator windings 2, 3, 4, the electric motor has a rotor 5 with a rotor shaft 6 which is pivotally mounted by way of a roller bearing 7 relative to the stator windings 2, 3, 4. The roller bearing 7 has an inside ring 8, an outside ring 9 and a roller body 10 located between the inner ring 8 and the outer ring 9. The inner ring 8 is electroconductively connected in a torsionally strong manner to the rotor shaft 6. The outer ring 9 can be pressed for example into a hole of a housing 11, which is only symbolically shown, and thus can be electroconductively connected in a torsionally strong manner to the housing 11. The rotor shaft 6 is generally supported by at least one other roller bearing 7 which, for the sake of clarity, is not specifically shown in the drawing figure.

The described wiring or described structure of the electric motor results in that there is a series of stray capacitances via which, in spite of DC insulation, voltages can be coupled in. In the drawing figure, the stray capacitances, to the extent they are relevant to the invention, are represented by one graphic symbol at a time. In particular, between the first stator winding 2 and the rotor 5 there is a first stray capacitance 12, between the second stator winding 3 and the rotor 5 there is a second stray capacitance 13, and between the third stator winding 4 and the rotor 5 there is a third stray capacitance 14. Furthermore, the roller bearing 7 forms a fourth stray capacitance 15 which is ultimately active between the outer ring 9 and the rotor shaft 6. Finally, there is another stray capacitance 16 constituting a fifth stray capacitance between the rotor 5 and the housing 11. By virtue of the stray capacitances 12, 13, 14, 15, 16, an unwanted capacitive parasitic current flows between the three stator windings 2, 3, 4 and the rotor 5 and thus also the rotor shaft 6 as a result of the star point voltage which is present in the region of the interconnection of the three stator windings 2, 3, 4. Accordingly, current flows between the rotor 5 or the rotor shaft 6 and the grounded housing 11.

By way of this parasitic current, between the rotor 5 and the housing 11 and therefore also on the roller bearing 7 or on the roller bearings 7, a voltage $U_L$ forms which is often larger without additional measures than the breakdown strength of the lubricating film in the roller bearing 7 which is typically roughly 0.5 volt. The voltage $U_L$ typically has values from 3% to 7% of the voltages on the stator windings relative to the housing 11. Thus, the voltage $U_L$ on the roller bearing 7 can trigger spark erosion which can lead to damage of the roller bearing 7.

This is inhibited or prevented by the circuit components described below and using a current which is of a corresponding magnitude as the parasitic current but opposite in phase to the parasitic current and coupling such compensation current to the bearing. That is, a current of similar or the same size but opposite in phase to the parasitic current is capacitively coupled into the rotor shaft 6. For generation of the compensation current, there is for example an artificial star point 17 in which the feed lines from the frequency converter 1 are combined into the stator windings 2, 3, 4 via one capacitor each. At the output 24 of the artificial star point 17, the same voltage arises as occurs within the motor as a result of the stray capacitances 12, 13, 14. The voltage $U_L$ results from the capacitive voltage division between the stray capacitances 12, 13, 14 on the one hand and 15, 16 on the other.

Amplitude matching 18 which is furthermore connected to the housing 11 is connected to the star point 17. The amplitude matching 18 has a variable tap from which the desired fraction of the voltage which has been delivered from the artificial star point 17 can be tapped. The variable tap of the amplitude matching 18 is connected to the primary winding 19 of a polarity reversal transformer 20 which is furthermore connected to the housing 11. The secondary winding 21 of the polarity reversal transformer 20 is on the one hand likewise connected to the housing 11 and on the other to the input of the frequency response matching 22. The direction of winding of the primary winding 19 and of the secondary winding 21 of the polarity reversal transformer 20 run in opposite directions, so that on the secondary winding 21 a voltage is delivered which is the inverse of the voltage on the primary winding 19. The frequency response matching 22 is connected on the output side to the coupling capacitor 23, one electrode of which is connected to the rotor shaft 6. Furthermore, the frequency response matching 22 is still connected to the housing 11.

Instead of providing amplitude matching 18 as an independent component, its function can also be integrated into the polarity reversal transformer 20. To do this, the primary winding 19 of the polarity reversal transformer 20 is connected to the star point 17 and the housing 11, and on the secondary winding there are several taps so that the amplitude of the voltage which is supplied to the frequency response matching 22 can be varied by selecting a suitable tap.

In the compensation of the parasitic currents which are coupled into the rotor 5, the process takes place as follows: Using the amplitude matching 18, a suitable fraction of the voltage on the artificial star point 17 is fed into the polarity reversal transformer 20 and in this way an inversely polarized voltage is produced. For further processing thus only a fraction of the voltage which is delivered at the artificial star point 17 is used and accordingly the components used in doing so need be designed only for this fraction of the voltage. The frequency response matching 22 matches the frequency response of the current resulting from this voltage to that of the parasitic current in order to enable compensation which is as exact as possible. The compensation current which has been produced in this way is fed into the rotor shaft 6 via the coupling capacitor 23 and ideally corresponds quantitatively to the sum of all the parasitic currents which are fed into the rotor 5 so that as a result of the reversed sign, little or no net current feed into the rotor 5 occurs. Thus, on the roller bearing 7 or on the roller bearings 7 in any case there is a small voltage $U_L$ which is not sufficient to cause damage to the roller bearing 7. The coupling of the compensation current into the rotor shaft 6 can take place by a suitable execution of the capacitor 23 as an air-insulated capacitor in the form of an element which is slipped onto the rotor shaft 6 without wearing parts. Alternatively, it is possible in the same way to couple the compensation current elsewhere into the rotor 5 or into the inner ring 8 of the roller bearing 7.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Device for protecting a bearing of an electrical machine against damaging passage of current, wherein the electrical machine comprises a stator and a rotor pivotally mounted relative to the stator by the bearing, the device comprising:
    a compensation circuit for producing a compensation current which compensates for a parasitic current arising during operation of the electrical machine and passing through the bearing, the compensation current has a corresponding magnitude as the parasitic current but opposite in phase to the parasitic current;
    a coupling element for direct or indirect coupling of the compensation current into the bearing;
    the compensation circuit comprising an artificial star point which prepares a star point voltage at which chase voltages for operation of the electrical machine are found, the artificial star point is formed by three identical impedances; and
    the compensation circuit also comprising a polarity reversal transformer having a primary side to which the star point voltage is supplied at least in part and a secondary side which produces a voltage opposite in phase to the star point voltage.

2. The device according to claim 1, wherein the compensation circuit also comprises an amplitude matching stage connected between the artificial star point and the polarity reversal transformer, the amplitude matching stage applying an adjustable fraction of the star point voltage to the polarity reversal transformer.

3. The device according to claim 2, wherein the polarity reversal transformer has several winding taps on the secondary side.

4. The device according to claim 3, wherein the polarity reversal transformer is connected on the secondary side to an input of a frequency response matching stage which equalizes a frequency response of the compensation current to the parasitic current.

5. The device according to claim 4, wherein an output of the frequency response matching stage is connected to the coupling element.

6. The device according to claim 5, wherein the coupling element is arranged such that coupling of the compensation current takes place into a rotor shaft of the rotor by which the rotor in the bearing is pivotally mounted.

7. The device according to claim 6, wherein the coupling element is a capacitor.

8. Device for protecting a bearing of an electrical machine against damaging passage of current, wherein the electrical machine comprises a stator and a rotor pivotally mounted relative to the stator by the bearing, the device comprising:
    a compensation circuit for producing a compensation current which compensates for a parasitic current arising during operation of the electrical machine and passing through the bearing, the compensation current has a corresponding magnitude as the parasitic current but opposite in phase to the parasitic current;
    a coupling element for direct or indirect coupling of the compensation current into the bearing;
    the compensation circuit comprising an artificial star point which prepares a star point voltage at which phase voltages for operation of the electrical machine are found; and
    the compensation circuit also comprising a polarity reversal transformer having a primary side to which the star point voltage is supplied at least in part and a secondary side which produces a voltage opposite in phase to the star point voltage.

9. The device according to claim 8, wherein the compensation circuit also comprises an amplitude matching stage connected between the artificial star point and the polarity reversal transformer, the amplitude matching stage applying an adjustable fraction of the star point voltage to the polarity reversal transformer.

10. The device according to claim 8, wherein the polarity reversal transformer has several winding taps on the secondary side.

11. The device according to claim 8, wherein the polarity reversal transformer is connected on the secondary side to an input of a frequency response matching stage which equalizes a frequency response of the compensation current to the parasitic current.

12. The device according to claim 11, wherein an output of the frequency response matching stage is connected to a coupling element.

13. The device according to claim 12, wherein the coupling element is arranged such that coupling of the compensation current takes place into a rotor shaft of the rotor by which the rotor in the bearing is pivotally mounted.

14. The device according to claim 12, wherein the coupling element is a capacitor.

15. Device for protecting a bearing, which supports a rotor of an electrical machine, against passage of parasitic current arising from operation of the electrical machine, the device comprising:

means for producing a compensation current corresponding in magnitude to the parasitic current but opposite in phase to the parasitic current;

coupling means for coupling the compensation current into the rotor;

the means for producing compensation current comprising an artificial star point which prepares a star point voltage at which phase voltages for operation of the electrical machine exist; and the means for producing compensation current also comprising a polarity reversal transformer having one side to which the star point voltage is at least partly supplied and a second side which produces a voltage opposite in phase to the star point voltage.

16. The device according to claim 15, wherein the means for producing compensation current also comprises an amplitude matching stage connected between the artificial star point and the polarity reversal transformer, the amplitude matching stage applying an adjustable fraction of the star point voltage to the polarity reversal transformer.

17. The device according to claim 15, wherein the coupling means couples the compensation current to the bearing element either directly or indirectly.

* * * * *